UNITED STATES PATENT OFFICE.

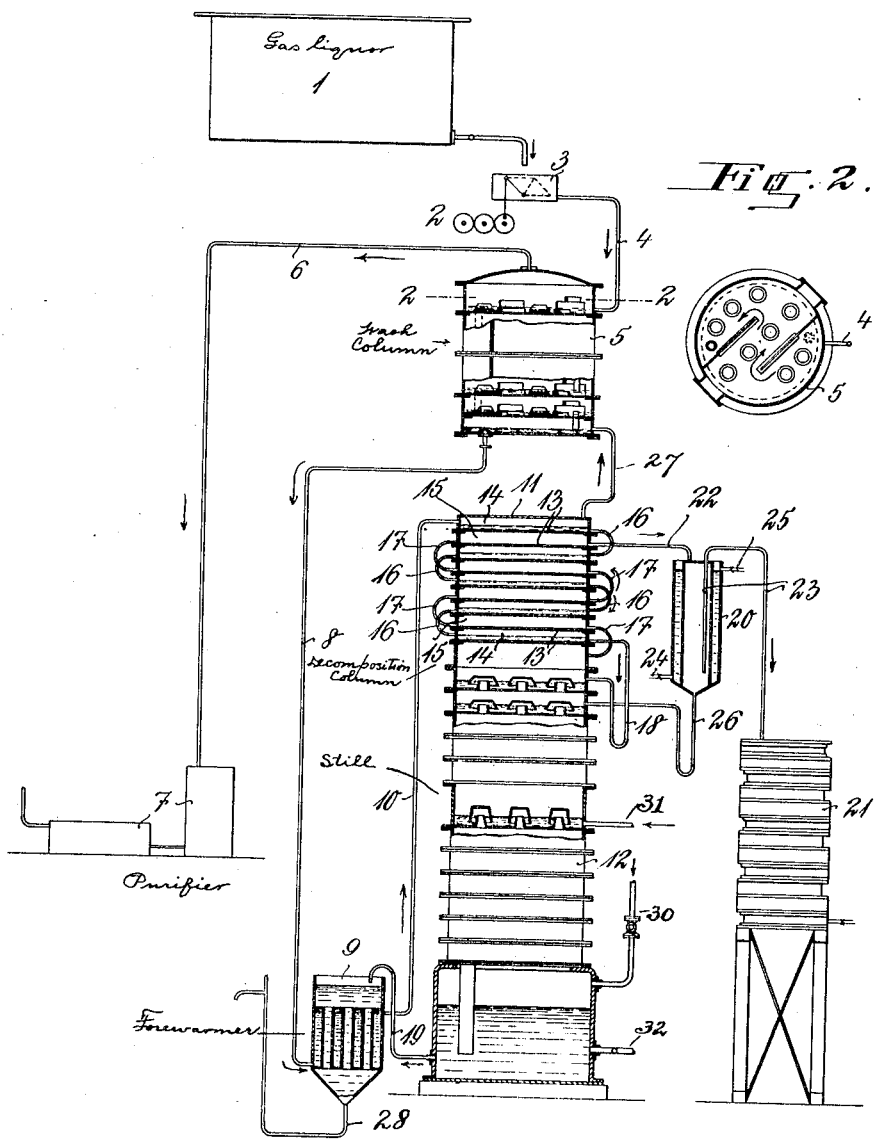

HERRMANN ARTHUR ABENDROTH, OF BERLIN, GERMANY.

DISTILLING APPARATUS.

No. 843,318.  Specification of Letters Patent.  Patented Feb. 5, 1907.

Application filed January 16, 1905. Serial No. 341,280.

*To all whom it may concern:*

Be it known that I, HERRMANN ARTHUR ABENDROTH, a citizen of the German Empire, residing at Berlin, Germany, have invented certain new and useful Improvements in Distilling Apparatus; and I do hereby declare the following to be a full, clear, and exact description of the invention, such as will enable others skilled in the art to which it appertains to make and use the same.

My invention relates to an apparatus for obtaining ammonia from gas liquor.

The object of my invention is to provide an apparatus by which a continuous operation, as distinguished from an intermittent operation, is possible, while at the same time a great economy of heat, of cooling-water, and of lime is attained.

With this general object in view an apparatus embodying my invention comprises the features, details of construction, and combination of parts, which will first be described in connection with the accompanying drawings and then more particularly pointed out in the claims.

In the drawings Figure 1 is a diagrammatic view of an apparatus embodying my invention, and Fig. 2 a sectional view of the wash-column.

Referring to the drawings, 1 is a tank containing the gas liquor to be treated, from which tank the liquor flows to a wash-column 5, preferably passing through a suitable measuring apparatus 3 on its way to said wash-column, this measuring apparatus consisting in the present instance of a tipping vessel connected to a counting mechanism, (indicated at 2.) From the measuring apparatus the gas liquor flows through a pipe 4 to the wash-column, which has a construction such as is shown in section in Fig. 2.

The wash-column is connected to a decomposition-column, to be more fully described hereinafter, by means of a pipe 27, through which it receives the carbonic acid and hydrogen sulfid, which escapes from the wash-column through a conductor 6 and may be led off through a chimney or conducted to a purifier, as indicated at 7. Any ammonia-gas which may accompany the carbonic-acid and hydrogen sulfid-gas from the decomposition-column is absorbed in the gas liquor, and thus retained by it.

From the wash-column 5 the gas liquor passes through a conductor 8 into a forewarmer 9, through whose tubes flows the exhausted gas liquor, leaving the distilling apparatus 12 by the pipe 19, in which forewarmer the incoming gas liquor—that is, the gas liquor from the wash-column 5 on its way to the distilling apparatus 12—is raised to a temperature of about 60° to 70° centigrade by the heat of the outflowing exhausted gas liquor. From here the gas liquor passes through the pipe 10 over to the decomposition-column 11, arranged over the distilling apparatus 12, in which decomposition-column the carbonic acid and the hydrogen sulfid are driven off. The decomposition-column consists of a number of chambers located one above the other and separated from each other by partitions 13. Of each two adjacent chambers one, 14, is passed through by the gas liquor which is to be treated, while through the other chamber 15 passes the ammonia-gas driven off from the distilling apparatus. The chambers 14 of the decomposition-column are connected in series by pipes 16, and the chambers 15 are also connected with each other in series by the pipes 17.

The gas liquor going into the decomposition-column 11 flows over the bottoms of the individual chambers 14 in unusually thin strata, thus rendering easier the evolution of the gas. These thin strata of gas liquor in the chambers 14 are heated to about 90° to 96° centigrade by the heat of the ammonia-gas in the adjacent chambers 15, which ammonia-gas is continuously driven off from the distilling apparatus below and passes through the chambers 15 on its way to the outlet-pipe 22.

In the decomposition-column the gas liquor gives off its carbonic acid and hydrogen sulfid, which escape through the pipe 27 to the wash-column 5.

From the decomposition-column the gas-liquor, deprived of the carbonic acid and hydrogen sulfid, goes through a seal-tube 18 to the distilling apparatus 12, which is of the usual construction, and from which the ammonia-gas is distilled off in a known manner.

The exhausted gas liquor flows off from the bottom of the distilling apparatus through the pipe 19, which conducts it to the forewarmer 9, from whence it escapes through a pipe 28. The pipe 31 serves for supplying milk of lime and the short pipe 32 for a testing-cock, as is usual in such forms of apparatus.

The ammonia-gas, leaving the upper part of the decomposition-column 11 through the pipe 22, flows through the usual backflow cooler or condenser 20 and leaves this through the pipe 23, which leads it to a cell-cooler 21 of usual construction. The back-flow-cooler 20 is provided with an inlet-pipe 24 and an outlet-pipe 25 for the circulation of cooling water through its water-jacket. Moreover, the lower part of the backflow-cooler 20 is connected with the upper part of the distilling apparatus 12 by a seal-pipe 26, through which any products of condensation formed in the backflow-cooler may return to the said distilling apparatus.

It will be noted that in my apparatus, while the still 12 is heated in the usual manner by steam admitted through the pipe 30, the temperature necessary for driving off the carbonic acid and hydrogen sulfid is obtained not by the use of any direct steam, but from two sources—viz., the waste heat of the exhausted gas liquor and the waste heat of the outflowing ammonia-gas. These two sources of heat are practically constant during the usual operation of the apparatus.

The exhausted gas liquor leaves the still with a temperature substantially constant at 100° centigrade. Consequently, as there is a constant inlet of the gas liquor and a resulting constant outflow of the exhausted liquor the inflowing gas liquor is heated to a substantially uniform temperature in the forewarmer without the necessity of special temperature-regulating apparatus or care in operating this part of the apparatus. Furthermore, the ammonia-gas driven off by the distilling apparatus escapes with a substantially uniform temperature, as its boiling-point is in the neighborhood of 100° centigrade. This escaping gas is sufficient to raise the already preheated incoming gas liquor to the temperature necessary to drive off the carbonic acid and hydrogen sulfid.

As the distilling-column must be operated at a temperature of about 100° centigrade in order to distil off the ammonia-gas and since any ordinary increase in the heat applied to said still will not materially affect the temperature of the outflowing exhausted gas liquor and cannot increase the temperature of the escaping ammonia-gas, it is impossible in the present apparatus to overheat the incoming gas liquor. Consequently the temperature of the decomposition-column is always sufficient to drive off the carbonic acid and the hydrogen sulfid, and yet cannot rise to a point where it will also drive off any appreciable amount of ammonia-gas. Moreover, it is also impossible for the temperature of the incoming gas liquor to fall below the temperature necessary to drive off the carbonic acid and hydrogen sulfid so long as the distilling apparatus is operating properly to drive off the ammonia-gas. Hence as has been found in practice by the normal operation of the distilling apparatus a temperature of the inflowing gas liquor is obtained which varies only within exceedingly narrow limits—viz., 2° centigrade. As a result the gas liquor enters the distilling apparatus at a temperature close to 100° centigrade—viz., about 96° centigrade—and it follows that a minimum amount of fuel is required to maintain the distilling apparatus in uniform operation. Also since the escaping ammonia-gas has a large part of its heat abstracted by the incoming gas liquor said ammonia-gas can be cooled to the desired temperature in the backflow-cooler and in the cell-cooler with less cooling-water than has heretofore been necessary. Another important advantage is that as practically all the carbonic acid and hydrogen sulfid are removed from the gas liquor prior to its entrance into the distilling apparatus by waste heat the lime employed is necessary only for releasing the bound ammonia, and consequently a considerable saving in lime results.

Having thus fully described my invention, what I claim as new, and desire to secure by Letters Patent of the United States, is—

1. The combination, with a distilling apparatus, of a forewarmer arranged to be heated by the outflowing exhausted liquor from the distilling apparatus, a decomposition-column arranged to be heated by the gas escaping from the distilling apparatus, and means for conducting the material to be distilled through the forewarmer, then through the decomposition-chamber out of contact with the escaping gas and then to the distilling apparatus.

2. The combination, with a distilling apparatus, and a decomposition-column located above the distilling apparatus and arranged to be heated by the gas escaping from the distilling apparatus, of a forewarmer, connections between the forewarmer and the distilling apparatus whereby the exhausted liquor from the distilling apparatus flows through and heats the forewarmer and means for leading the incoming material to be treated through the forewarmer, then through the decomposition-column out of contact with the escaping gas and then into the distilling apparatus.

3. The combination, with a distilling apparatus, and a decomposition-column located above the distilling apparatus and traversed by the gas liquor and arranged to be heated by the gas escaping from the distilling apparatus without admixture of the gas and gas liquor, of a forewarmer, connections between the forewarmer and the distilling apparatus whereby the exhausted liquor from the distilling apparatus flows through and heats the forewarmer, and means for leading off gases driven off from the gas liquor in the decomposition-column.

4. The combination, with a distilling apparatus, and a decomposition-column located above the distilling apparatus and traversed by the gas liquor and arranged to be heated by the gas escaping from the distilling apparatus without admixture of the gas and gas liquor, of a forewarmer, connections between the forewarmer and the distilling apparatus whereby the exhausted liquor from the distilling apparatus flows through and heats the forewarmer, means for leading off gases driven off from the gas liquor in the decomposition-column, means for cooling the ammonia-gas, and connections between the decomposition-column and said cooling means whereby the ammonia-gas, after heating the decomposition-column is led to the said cooling means.

5. The combination with a distilling apparatus, and a decomposition-column arranged to be traversed and heated by the ammonia-gas escaping from the distilling apparatus, of a wash-column traversed by the fresh gas liquor, a forewarmer, connections between the forewarmer and the distilling apparatus whereby the exhausted liquor from the distilling apparatus flows through and heats the forewarmer, means for leading off to the wash-column the gases driven off from the gas liquor in the decomposition-column, and means for leading the gas liquor through the wash-column, the forewarmer, the decomposition-column, and then into the distilling apparatus.

In testimony whereof I hereunto affix my signature in the presence of two witnesses.

HERRMANN ARTHUR ABENDROTH.

Witnesses:
HENRY HASPER,
WOLDEMAR HAUPT.